(12) United States Patent
Byun et al.

(10) Patent No.: US 7,488,556 B2
(45) Date of Patent: Feb. 10, 2009

(54) BATTERY MODULE AND ITS METHOD OF MANUFACTURE

(75) Inventors: Sang-Won Byun, Suwon (KR); Masanori Kogure, Suwon-si (KR); Dae-Won Han, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/010,083

(22) Filed: Jan. 18, 2008

(65) Prior Publication Data

US 2008/0176135 A1    Jul. 24, 2008

(30) Foreign Application Priority Data

Jan. 19, 2007    (KR) .................. 10-2007-0006173

(51) Int. Cl.
*H01M 2/26*    (2006.01)
(52) U.S. Cl. ....................... 429/211; 29/623.1
(58) Field of Classification Search .................. 429/164
See application file for complete search history.

(56) References Cited

U.S. PATENT DOCUMENTS

2003/0138693 A1    7/2003    Suzuki

FOREIGN PATENT DOCUMENTS

| JP | 10154505 | * | 6/1998 |
| KR | 10-2000-0009696 | | 2/2000 |
| KR | 10-2005-0074202 | | 7/2005 |

OTHER PUBLICATIONS

IPDL PAJ JPO Machine Translation for JP10-154505 (JIRO et al.).*

* cited by examiner

*Primary Examiner*—Susy N Tsang-Foster
*Assistant Examiner*—Adam A Arciero
(74) *Attorney, Agent, or Firm*—Robert E. Bushnell, Esq.

(57) ABSTRACT

A rechargeable battery that prevents a concentration of stress on a coupling portion of a lead tab and a cap assembly at a time of bending the lead tab so as to not damage the coupling portion includes: an electrode assembly having a first electrode, a second electrode, and a separator interposed between the first and second electrodes; a case to receive the electrode assembly and having an open top portion; a cap assembly arranged on the top portion of the case; a lead tab having one end affixed to the cap assembly to electrically connect the cap assembly to the first electrode; and a stopper fixed to the cap assembly and having one end arranged on the lead tab, the stopper allowing a portion of the lead tab contacting the one end of the stopper to be bent when the lead tab is bent.

13 Claims, 5 Drawing Sheets

BATTERY MODULE AND ITS METHOD OF MANUFACTURE

CLAIM OF PRIORITY

This application makes reference to, incorporates the same herein, and claims all benefits accruing under 35 U.S.C. §119 from an application earlier filed in the Korean Intellectual Property Office on the 19$^{th}$ of Jan. 2007 and there duly assigned Serial No. 10-2007-0006173.

BACKGROUND OF THE INVENTION

1. Field of the Invention

The present invention relates to a rechargeable battery and its method of manufacture, and more particularly, the present invention relates to a rechargeable battery having an enhanced lead tab coupling structure and its method of manufacture.

2. Description of the Related Art

Rechargeable batteries can repeatedly charge and discharge due to a reversible transformation between chemical energy and electrical energy thereof. Nickel-cadmium batteries, Nickel-hydrogen batteries, and lithium rechargeable batteries are widely used rechargeable batteries. The lithium rechargeable battery has an operating voltage of 3.6V or more. The operating voltage of the lithium-cadmium battery is three times higher than that of the nickel-cadmium battery or the nickel-hydrogen battery. In addition, the lithium rechargeable battery has a high energy density per unit weight. Therefore, recently, the lithium rechargeable battery has been widely used as a power source for portable electronic apparatuses. The lithium rechargeable battery is classified as a lithium-ion rechargeable battery, a lithium-ion polymer battery, and a lithium polymer battery.

A typical rechargeable battery includes an electrode assembly having an anode, a cathode, and a separator disposed between the anode and the cathode, a case containing the electrode assembly, and a cap assembly coupled to the case to seal the case. The anode and the cathode are provided with respective uncoated anode and cathode parts that are not coated with an activation material. The uncoated anode and cathode parts are disposed in different directions.

The uncoated cathode part is coupled to a cathode collector plate electrically connected to the case, and the uncoated anode part is coupled to an anode collector plate electrically connected to the cap assembly.

The cap assembly and the anode collector plate are connected to each other by a lead tab made of a conductive metal. The lead tab is welded to the cap assembly and the anode collector plate. The lead tab in a bent state is disposed between the cap assembly and the anode collector plate.

However, conventionally, when the lead tab is subject to a bending process, stress is concentrated on a coupling portion of the lead tab and the cap assembly. Therefore, the coupling portion may be damaged. Accordingly, the damage may cause degradation in performance of the rechargeable battery. Moreover, if the coupling portion is broken, the anode and the cap assembly are electrically disconnected, so that the rechargeable battery cannot function.

SUMMARY OF THE INVENTION

The present invention has been made in an effort to provide a rechargeable battery having advantages of preventing concentration of stress on a coupling portion of a lead tab and a cap assembly at a time of bending the lead tab so as not to damage the coupling portion.

An exemplary embodiment of the present invention provides a rechargeable battery including: an electrode assembly having a first electrode, a second electrode, and a separator interposed between the first and second electrodes; a case to contain the electrode assembly and including an open top portion; a cap assembly disposed on the top portion of the case; a lead tab including one end affixed to the cap assembly to electrically connect the cap assembly to the first electrode; and a stopper affixed to the cap assembly and having one end arranged on the lead tab, the stopper facilitating a portion of the lead tab contacting the one end of the stopper to be bent when the lead tab is bent.

The one end of the stopper may be disposed on a portion of the lead tab separated from the portion of the lead tab affixed to the cap assembly. The one end of the stopper may be disposed on the portion of the lead tab affixed to the cap assembly.

The cap assembly may include a cap plate, and one end of the lead tab may be affixed to an edge of one surface of the cap plate.

The stopper may be fixed to the cap assembly by welding. In addition, the stopper may be welded and fixed to a portion of the cap assembly to which the lead tab is welded.

Another embodiment of the present invention provides a rechargeable battery including: an electrode assembly having a first electrode, a second electrode, and a separator interposed between the first and second electrodes; a case to receive the electrode assembly and including an open top portion; a cap assembly disposed on the top portion of the case and including a cap plate; and a lead tab connecting the cap plate to the first electrode, wherein a portion of the lead tab separated from one end thereof is affixed to an edge of one surface of the cap plate by, and wherein an end of a first portion of the lead tab, disposed on one side of the portion of the lead tab affixed to the cap plate, is bent toward a second portion of the lead tab disposed on an opposite side thereof.

The end of the first portion of the lead tab may be disposed on the portion of the lead tab affixed to the cap plate. In addition, the end of the first portion of the lead tab may be disposed on a portion of the second portion separated from the portion of the lead tab affixed to the cap plate.

The rechargeable battery may further include a first electrode collector plate disposed on an upper portion of the first electrode to be electrically connected to the first electrode, wherein the lead tab is coupled to a lead member connected to the first electrode collector plate.

Yet another embodiment of the present invention provides a method of manufacturing a rechargeable battery including: forming a first electrode, a cap plate, and a lead tab to electrically connect the first electrode to the cap plate; affixing a portion of the lead tab separated from one end thereof to an edge of one surface of the cap plate; bending an end of a first portion of the lead tab, disposed on one side of the portion of the lead tab affixed to the cap plate, toward a second portion of the lead tab, disposed on an opposite side thereof; and bending a portion of the second portion contacting the first portion when bending the second portion.

In bending the first portion of the lead tab, the end of the first portion may be disposed on the portion of the lead tab affixed to the cap plate.

In bending the first portion of the lead tab, the end of the first portion may be disposed on a portion of the second portion separated from the portion of the lead tab affixed to the cap plate.

The lead tab may be affixed to the cap plate by welding.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
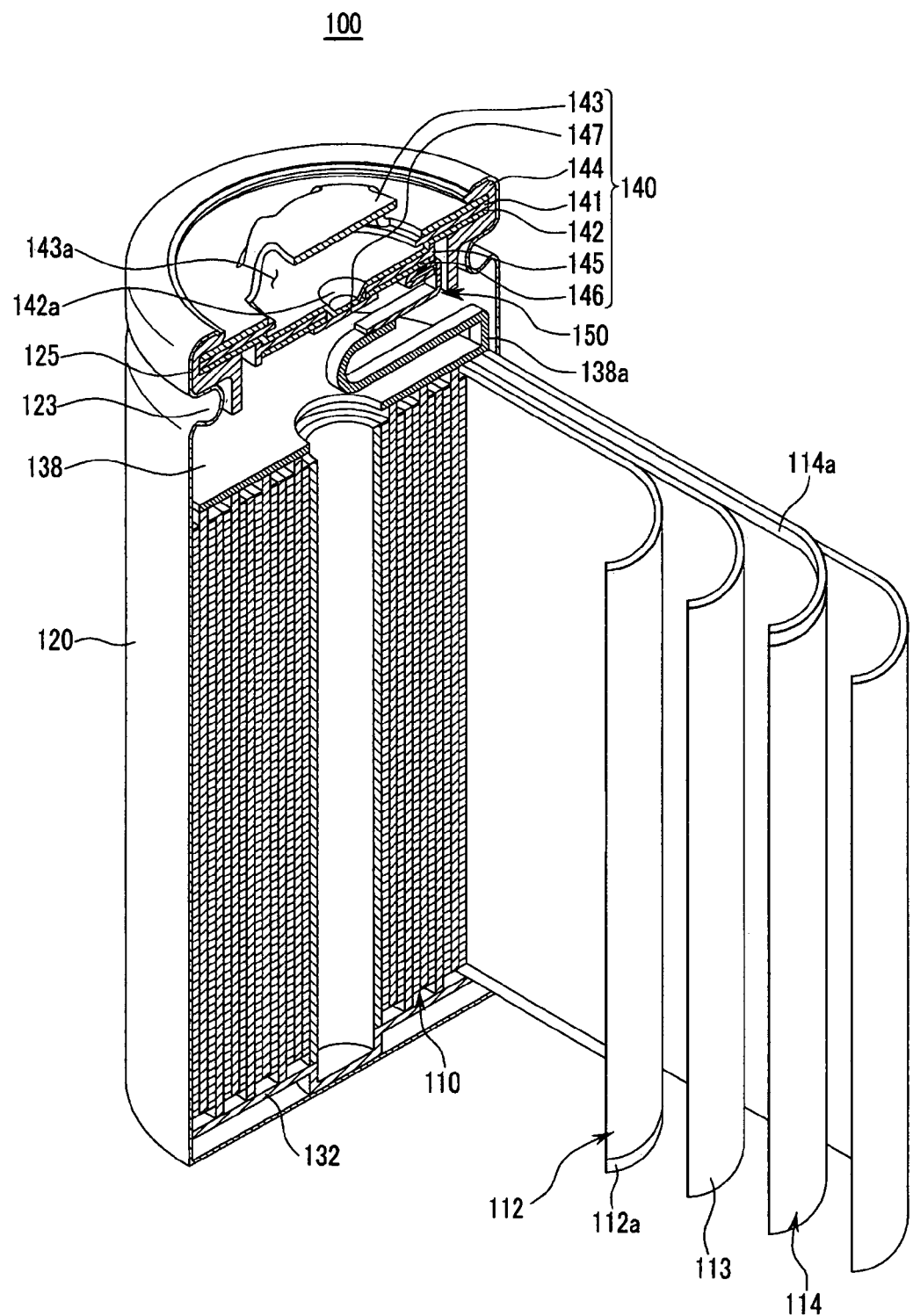
FIG. 1 is an exploded perspective view of a rechargeable battery according to a first embodiment of the present invention.

Hereinafter, exemplary embodiments of the present invention are described in detail with reference to the accompanying drawings in order for a person ordinarily skilled in the art to easily implement the present invention. The present invention may be modified in various different ways, and is not limited to the described embodiments. For clarity, description of some constructions and elements not directly related to the present invention have been omitted. Like reference numerals denote like elements. Detailed descriptions of well-known features have been omitted.

FIG. 1 is an exploded perspective view of a rechargeable battery 100 according a first embodiment of the present invention. In the first embodiment, a lithium ion rechargeable battery is used as an example of the rechargeable battery 100 for explaining the principles of the present invention. However, the present invention is not limited to the lithium ion rechargeable battery.

As shown in FIG. 1, the rechargeable battery 100 includes an electrode assembly 110, a case 120, and a cap assembly 140.

The electrode assembly 110 includes a first electrode (anode) 114 formed by applying an anode activation material to a collector plate, a second electrode (cathode) 112 formed by applying a cathode activation material to a collector plate, and a separator 113 disposed between the anode 114 and the cathode 112 to prevent a short-circuit therebetween.

More specifically, the cathode 112 is constructed by coating a slurry-type activation material layer in which a cathode activation material powder, a cathode binder, and a binding material are mixed on a collector plate, such as a copper plate. The cathode activation material powder may be formed by using, as a main material, a carbon material such as natural graphite, artificial graphite, a graphite-type carbon, a non-graphite-type carbon, or a combination thereof.

An uncoated cathode part 112a that is not coated with the activation material layer is formed along a lower edge of the cathode 112. The uncoated cathode part 112a contacts and is connected to a cathode collector plate 132 disposed at the bottom of the case. Accordingly, the cathode 112 is electrically connected to the case 120, so that the case 120 can function as a cathode terminal of the rechargeable battery.

On the other hand, the anode 114 is constructed by coating a slurry-type activation material layer in which an anode activation material powder, an anode binder, and an anode conductive additive are mixed on a collector plate, such as an aluminum plate. The anode activation material powder may be formed by using a lithium metal oxide such as $LiCoO_2$, $LiMnO_2$, $LiNiO_2$, $LiCrO_2$, and $LiMn_2O_4$.

An uncoated anode part 114a that is not coated with the activation material layer is formed along an edge of the anode 114. The uncoated anode part 114a is connected to an anode collector plate 138 that is disposed above the uncoated anode part 114a. The anode collector plate 138 is connected to the cap assembly 140 through a lead member 138a and a lead tab 150.

The separator 113 has functions of separating the cathode 112 from the anode 114 and providing a transport channel for lithium ions. The separator may be constructed of a single-layered film of polyethylene, polypropylene, or polyvinylidene fluoride, or a multi-layered film formed of two or more layers thereof. In addition, the separator may be constructed as a complex multi-layered film, such as a two-layered separator of polyethylene/polypropylene, a three-layered separator of polyethylene/polypropylene/polyethylene, and a three-layered separator of polypropylene/polyethylene/polypropylene.

The electrode assembly 110 is formed by sequentially stacking the cathode 112, the separator 113, and the anode 114, providing a central bar to one end of the stacked structure, and trimming the stacked structure into a substantially cylindrical shape. The electrode assembly 110 is inserted into the case 120, and the central bar is drawn out from the electrode assembly 110. A center pin (not shown) is inserted into a hollow portion formed by drawing out the central bar.

The central pin prevents deformation of the electrode assembly 10 during a charge or discharge period of the rechargeable battery 100. The central pin has a shape of a hollow cylinder. The central pin may be made of iron, copper, nickel, a nickel alloy, or other metals. In addition, the central pin may be made of a polymer.

Alternatively, without drawing out the aforementioned central bar from the electrode assembly 110, the central bar may be used as a substitute for the central pin. Such a modification is well-known to a person of ordinary skill in the art.

The case 120 has a substantially cylindrical space that contains the electrode assembly 110. The case 120 is made of a conductive metallic material such aluminum, an aluminum alloy, and nickel-coated steel. The top portion of the case 120 is initially open, so that the electrode assembly 110 can be inserted into the case 120 through the open top portion.

The cap assembly 140 is coupled to the open top portion of the case 120 to seal the case 120. During a process of coupling the case 120 to the cap assembly 140, a bead portion 123 and a crimp portion 125 are formed in the case 120.

In addition, an electrolyte solution (not shown) is injected into the case 120. Lithium ions generated by an electrochemical reaction between the cathode 112 and anode 114 during the charging and discharging periods can be transported due to the electrolyte solution.

The cap assembly 140 includes a positive temperature coefficient element 141, a safety vent 142, an electrode cap 143, a gasket 144, an insulator 145, a cap plate 146, and a sub-plate 147.

The gasket 144 is disposed between the case 120 and the electrode cap 143, the positive temperature coefficient element 141, and the safety vent 142 to surround circumferences of the electrode cap 143, the positive temperature coefficient element 141, and the safety vent 142. Therefore, the gasket 144 isolates the electrode cap 143, the positive temperature coefficient element 141, and the safety vent 142 from the case 120.

The safety vent 142 has a hollow protrusion portion 142a at the central portion thereof. The safety vent 142 is electrically connected to the anode 114 through the cap plate 146, the sub-plate 147, the lead tab 150, and the anode collector plate 138, which are disposed under the safety vent 142. For the electrical connection to the anode 114, the protrusion portion 142a is fixed to the sub-plate 147 by welding, and the lead tab 150 is fixed to the cap plate 146 and the lead member 138a of the anode collector plate 138 by welding.

When an internal pressure of the rechargeable battery 100 increases to a predetermined pressure or more due to some problem, the safety vent 142 is designed to be electrically disconnected from the anode 114. More specifically, when the internal pressure of the rechargeable battery 100 increases excessively, the-protrusion portion 142a of the safety vent 142 and the welding portion of the sub-plate 147 are disconnected due to the increasing internal pressure. Therefore, the safety vent 142 can be electrically disconnected from the anode 114 by the insulator 145 disposed under the safety vent 142. Moreover, when the internal pressure of the rechargeable battery 100 further increases, the safety vent 142 is ruptured. A gas in the rechargeable battery 100 can be vent through the ruptured portion of the safety vent 142 and a venting hole 143a.

The positive temperature coefficient element 141 is connected to an upper portion of the safety vent 142. Electrical resistance of the positive temperature coefficient element 141 increases to almost infinity when the temperature of the element 141 is over a predetermine temperature. Therefore, when the temperature of the rechargeable battery 100 is more than a predetermined temperature, a flow of the charging and discharging current can be stopped by using the positive temperature coefficient element 141. However, when the temperature of the rechargeable battery 100 drops down to the predetermined temperature, the electrical resistance of the positive temperature coefficient element 141 decreases, so that the functions of the rechargeable battery 100 can be recovered.

The rechargeable battery 100 according to the first embodiment includes separate safety elements for preventing overcharge, over-discharge, over-heat, and over-current as well as the aforementioned safety vent 142 and positive temperature coefficient element 141.

The venting hole 143a is provided to a side of the electrode cap 143. The electrode cap 143 is connected to an upper portion of the positive temperature coefficient element 141 to function as an anode terminal for applying current outwards.

The insulator 145 is disposed between the safety vent 142 and the cap plate 146. A hole is formed to penetrate central portions of the insulator 145 and the cap plate 146, and the protrusion portion 142a of the safety vent 142 penetrates the hole to contact with the sub-plate 147. Except for the protrusion portion 142a of the safety vent 142, the other portions thereof are electrically isolated from the cap plate 146. In such a construction, when a welding portion of the protrusion portion 142a of the safety vent 142 and the sub-plate 147 is disconnected, the safety vent 142 can be electrically disconnected from the anode 114.

One side of the lead tab 150 is fixed on the cap plate 146, and the other side thereof is fixed to the lead member 138a of the anode collector plate 138, so that the cap plate 146 can be electrically connected to the anode 114. The lead tab 150 maybe fixed to the cap plate 146 and the lead member 138a by welding.

The lead member 138a may be integrally formed with the anode collector plate 138. Alternatively, the lead member 138a may be fixed to the anode collector plate 138 by welding a separately-formed member to the anode collector plate 138.

Figure 2:
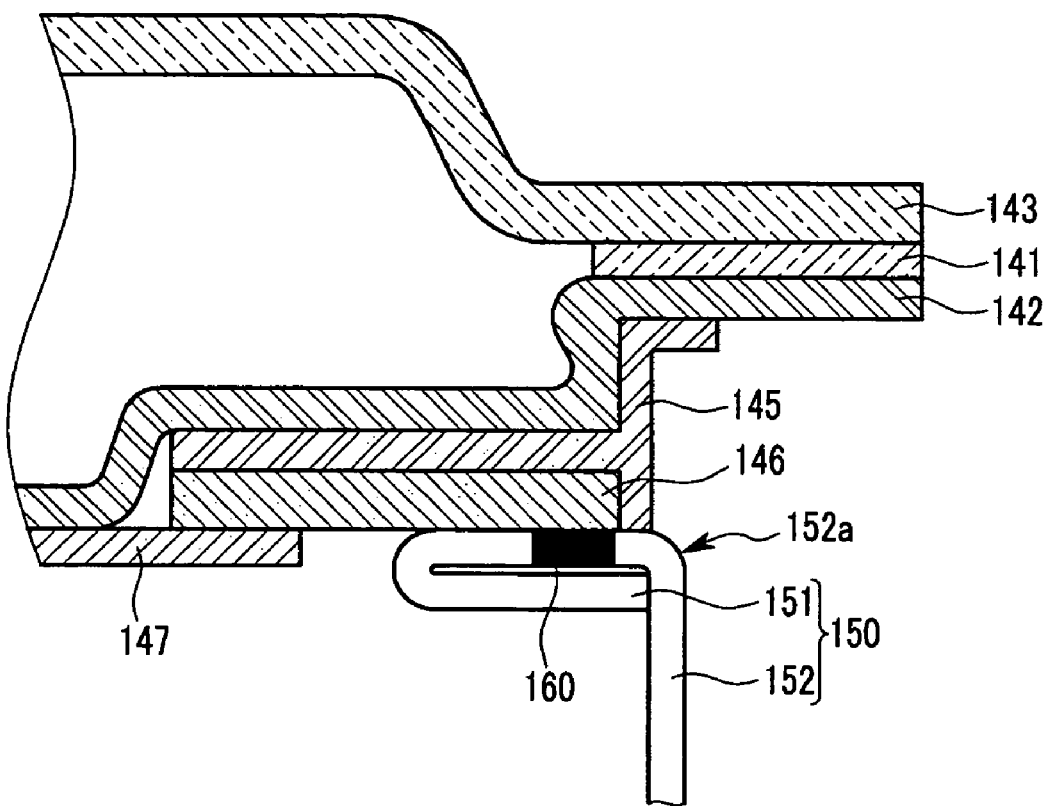
FIG. 2 is a partially enlarged cross-sectional view of FIG. 1.

FIG. 2 is a cross-sectional view of the lead tab 150 coupled to the cap assembly 140. The coupling structure of the lead tab 150 is described in detail below with reference to FIG. 2.

A portion of the lead tab 150 spaced apart from one end thereof is fixed to an edge of one surface of the cap plate 146 by welding. An end of a first portion 151 of the lead tab 150, arranged on one side of the welding portion 160, is bent toward a second portion 152 of the lead tab 250 arranged on the opposite side thereof. Due to the bending, the end of the first portion 151 is arranged on the second portion 152.

The other end of the second portion 152 of the lead tab 150 opposite to the end connected to the welding portion is connected to the lead member 138a of the anode collector plate 138 disposed under the cap plate 146. The lead member 138a is integrally formed with the anode collector plate 138. However, the present invention is not limited thereto.

The second portion 152 of the lead tab 150 is bent to be coupled with the lead member 138a (see FIG. 1). When the second portion 152 is bent, a portion of the second portion 152 contacting the end of the first portion 151 is bent. Conventionally, when the second portion 152 of the lead tab 150 is bent, the welding portion 160 is bent, so that the welding portion 160 may be damaged. However, according to the first embodiment, when the second portion 152 is bent, the portion 152a that is separated by a predetermined distance from the welding portion 160 is bent. Accordingly, concentration of stress on the welding portion 160 is prevented.

Figure 3:
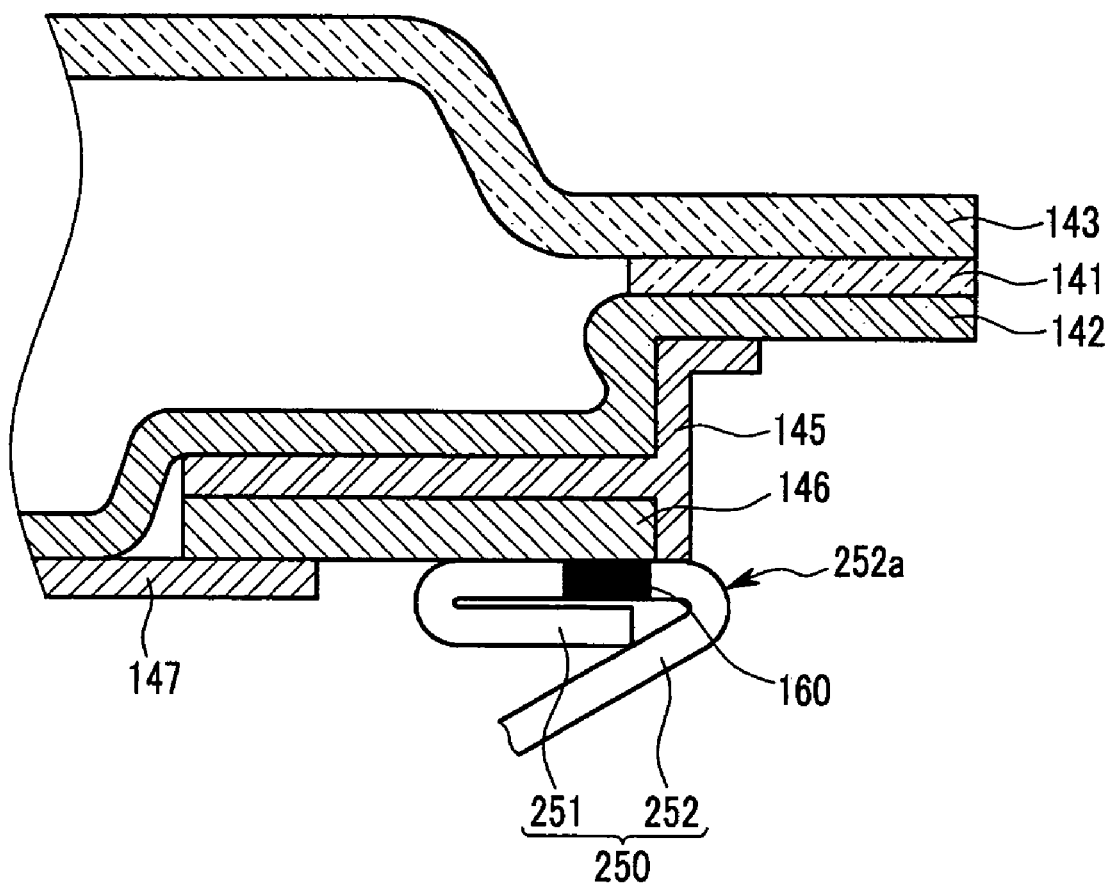
FIG. 3 is a cross-sectional view of a rechargeable battery according to a second embodiment of the present invention.

FIG. 3 is a cross-sectional view of a portion of a rechargeable battery according to a second embodiment of the present invention. As shown in FIG. 3, an end of a first portion 251 of a lead tab 250 is arranged on the welding portion 160. Other technical features except for the aforementioned construction are the same as those of the first embodiment.

According to the second embodiment, when a second portion 252 of the lead tab 250 is bent, a portion 252a of the second portion 252 separated by a predetermined distance from the welding portion 160 is bent to contact an end of the first portion 251 of the lead tab 250. Accordingly, when the second portion 252 is bent, concentration of stress on the welding portion 160 is prevented.

Figure 4:
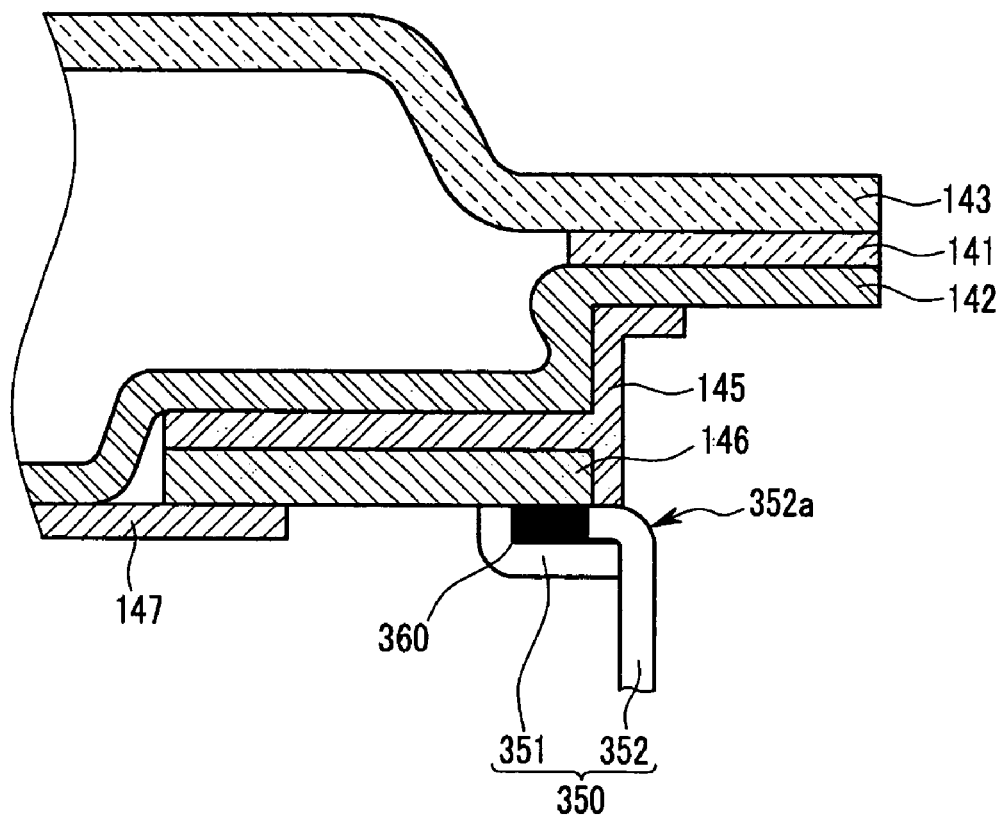
FIG. 4 is a cross-sectional view of a rechargeable battery according to a third embodiment of the present invention.

FIG. 4 is a cross-sectional view of a rechargeable battery according to a third embodiment of the present invention. Referring to FIG. 4, an end of a lead tab 350 is fixed on an edge of one surface of the cap plate 146 by welding. The welding may be laser welding or resistance welding. The other end of the lead tab 350 is coupled to the lead member 138a (see FIG. 1) of the anode collector plate 138 (see FIG. 1).

A stopper 351 is fixed to the cap plate 146 by welding. The stopper 351 is vented toward the lead tab 350 so that an end of the stopper 361 is disposed on a portion of the lead tab 350 separated by a predetermined distance from the welding portion 360. Alternatively, the one end of the stopper 351 may be disposed on the welding portion 360. In addition, the stopper 351 maybe connected to the welding portion, that is, the coupling portion of the cap plate 146 and the lead tab 350 as well as the cap plate 146.

The lead tab 350 is bent to be coupled with the lead member 138a. When the lead tab 350 is bent, the lead tab 350 is bent at the portion 350a contacting the one end of the stopper 351.

Conventionally, when the lead tab 350 is bent, the welding portion 360 is bent, so that the welding portion 360 may be damaged. According to the third embodiment, when the lead tab 350 is bent, the portion 350a that is separated by a predetermined distance from the welding portion 360 is bent, so that concentration of stress on the welding portion 360 is prevented.

Figure 5:
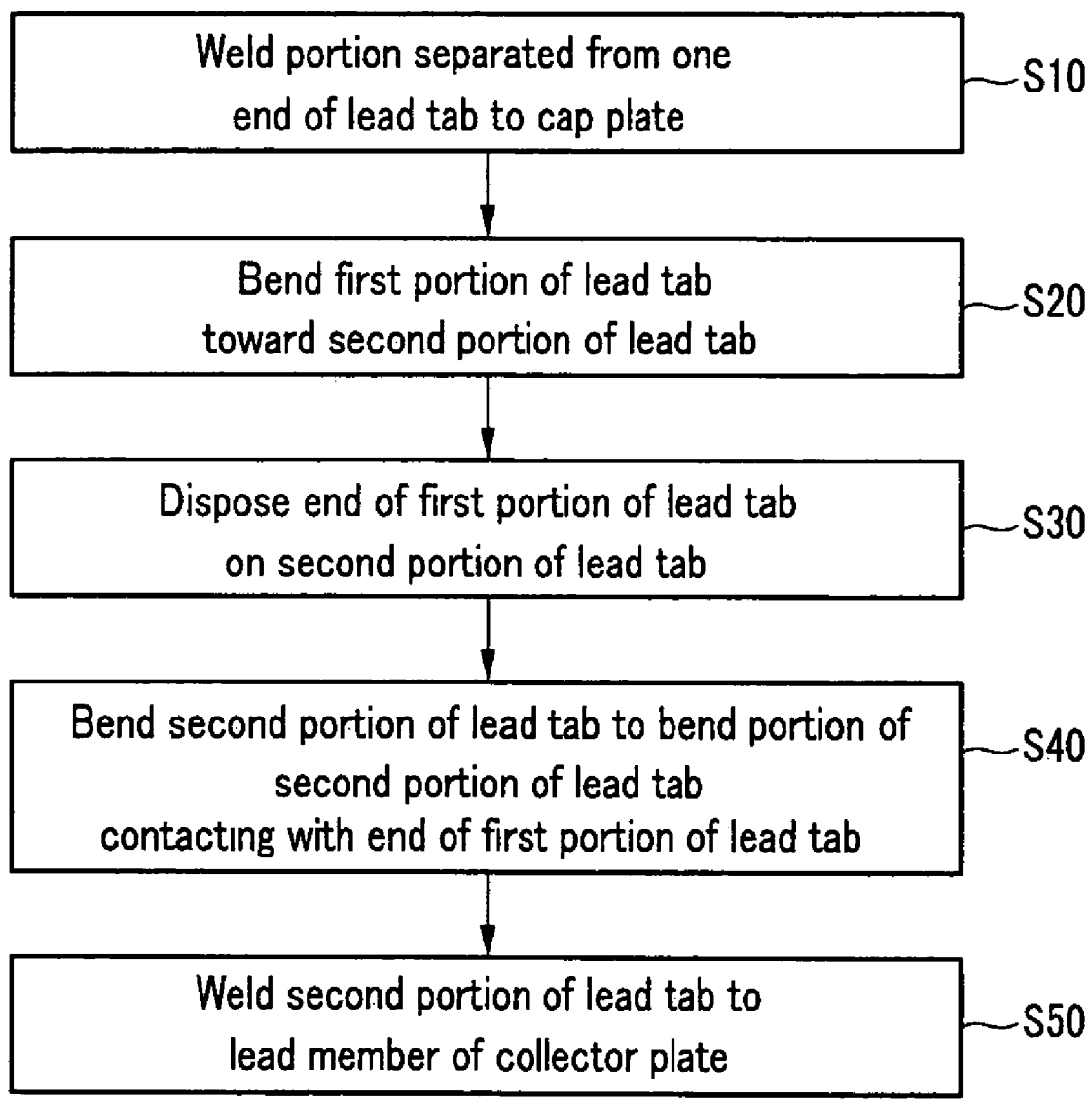
FIG. 5 is a flowchart for explaining a rechargeable battery manufacturing method according to an embodiment of the present invention.

FIG. 5 is a flowchart for explaining a rechargeable battery manufacturing method according to an embodiment of the present invention Referring to FIG. 5, firstly, a first electrode, a cap plate, and a lead tab for electrically connecting the first electrode and the cap plate are formed (not shown).

Next, a portion of the lead tab separated by a predetermined distance from one end thereof is welded to an edge of one surface of the cap plate (S10).

Next, an end of a first portion of the lead tab, arranged on one side of the welding portion, is bent toward a second portion of the lead tab arranged on the opposite side (S20).

Subsequently, the one end of the first portion is arranged on a portion of the second portion separated by a predetermined distance from the welding portion (S30). Alternatively, the one end of the first portion may be arranged on the welding portion of the lead tab and the cap plate.

Next, the second portion of the lead tab is bent (S40). The portion of the second portion separated by a predetermined distance from the welding portion is bent to contact the end of the first portion. Accordingly, concentration of stress on the welding portion 160 is prevented.

Finally, the second portion of the lead tab is coupled to the lead member of the anode collector plate by welding (S50).

According to the rechargeable battery manufacturing method, when the lead tab is bent, the coupling portion of the lead tab is not bent, but rather a portion that is separated from the coupling portion is bent. As a result, damage to the coupling portion is prevented.

Although the present invention can be implemented with various embodiments, the embodiments are exemplified for description of the principle of the present invention. However, the present invention is not limited thereto. Therefore, the present invention is not limited to the aforementioned embodiments, and it will be understood by a person of ordinarily skill in the art that various modifications and changes may be made without departing from the spirit and scope of the present invention.

As described above, according to the embodiments of the present invention, due to a stopper or a first portion of a lead tab, when the lead tab is bent, concentration of stress on a coupling portion of the lead cap and a cap assembly is prevented.

In addition, since stress is not concentrated on the coupling portion, a process of bending the lead tab can be easily performed, so that a manufacturing process time can be reduced.

While this invention has been described in connection with what is presently considered to be practical embodiments, it is to be understood that the present invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly having a first electrode, a second electrode, and a separator interposed between the first and second electrodes;
a case to receive the electrode assembly, the case including an open portion;
a cap assembly arranged on the open portion of the case, the cap assembly sealing the case;
a lead tab having one end affixed to the cap assembly to connect the cap assembly to the first electrode while bending toward the first electrode; and
a stopper having a first end affixed to the cap assembly and having a second end arranged closely to a bending portion of the lead tab, the stopper supporting the bent lead tab.

2. The rechargeable battery of claim 1, wherein the second end of the stopper is arranged on a portion of the lead tab separated from the portion of the lead tab affixed to the cap assembly.

3. The rechargeable battery of claim 1, wherein the second end of the stopper is arranged on the portion of the lead tab affixed to the cap assembly.

4. The rechargeable battery of claim 1, wherein the cap assembly includes a cap plate, the one end of the lead tab being welded to an edge of one surface of the cap plate.

5. The rechargeable battery of claim 4, wherein the stopper is welded to the cap plate.

6. The rechargeable battery of claim 5, wherein the stopper is welded to a portion affixed to the lead tab together.

7. A rechargeable battery comprising:
an electrode assembly having a first electrode, a second electrode, and a separator interposed between the first and second electrodes;
a case to receive the electrode assembly, the case including an open portion;
a cap assembly arranged on the open portion of the case and including a cap plate; and
a lead tab connecting the cap plate to the first electrode;
a portion of the lead tab separated from a first end in the direction toward a second end thereof, is welded to an edge of one surface of the cap plate; and
a first portion of the lead tab, arranged on one side of the portion of the lead tab affixed to the cap plate, is bent and the end of the first portion is arranged closely to a bent portion of a second portion of the lead tab arranged on an opposite side thereof, the end of the first portion supporting the second portion.

8. The rechargeable battery of claim 7, wherein the end of the first portion of the lead tab is disposed on the portion of the lead tab welded to the cap plate.

9. The rechargeable battery of claim 7, wherein the end of the first portion of the lead tab is arranged on a portion of the second portion separated from the portion of the lead tab welded to the cap plate.

10. The rechargeable battery of claim 7, further comprising a first electrode collector plate having a one end electrically connected to the first electrode, and a lead member is formed toward an opposite end of the one end;
wherein the lead tab is connected to the lead member.

11. A method of manufacturing a rechargeable battery comprising:
forming a first electrode, a cap plate, and a lead tab connecting the first electrode to the cap plate;
welding a portion of the lead tab separated from a first end in the direction toward a second end thereof, to an edge of one surface of the cap plate;
bending an end of a first portion of the lead tab, arranged on one side of the portion of the lead tab affixed to the cap plate, toward a second portion of the lead tab arranged on an opposite side thereof; and
bending a section of the second portion supported by the end of the first portion when bending the second portion.

12. The method of claim 11, wherein, in the bending of the second portion of the lead tab, an end of the first portion is arranged on the portion of the lead tab welded to the cap plate and supports the second portion.

13. The method of claim 11, wherein, in the bending of the second portion of the lead tab, an end of the first portion is disposed on a portion separated from the portion of the lead tab welded to the cap plate and supports the second portion.

* * * * *